United States Patent [19]

Johnson

[11] Patent Number: 5,116,538

[45] Date of Patent: May 26, 1992

[54] BATTERY TERMINAL CORROSION PROTECTION

[76] Inventor: Jerome Johnson, Rte. 4, Box 4022, Hayward, Wis. 54843

[21] Appl. No.: 445,362

[22] Filed: Dec. 4, 1989

[51] Int. Cl.$^5$ .................. C23F 11/18; C23F 11/10
[52] U.S. Cl. .................. 252/389.61; 252/389.62; 252/39; 252/40; 429/65
[58] Field of Search ............ 252/396, 389.61, 389.62, 252/38, 39, 40, 49.7, 76, 14, 18; 429/65

[56] References Cited

U.S. PATENT DOCUMENTS

| Re. 32,235 | 8/1986 | Forsberg | 252/39 |
|---|---|---|---|
| 711,360 | 6/1954 | Maatschappij | 252/49.7 |
| 2,648,634 | 8/1953 | Moore | 252/39 |
| 2,652,365 | 9/1953 | Moore | 252/39 |
| 2,892,778 | 6/1959 | Carter et al. | 252/39 |
| 3,071,546 | 1/1963 | Tuyle | 252/39 |
| 3,077,450 | 2/1963 | Morway | 252/39 |
| 3,159,574 | 12/1964 | Criddle | 252/39 |
| 3,178,367 | 4/1965 | Dubin | 252/39 |
| 3,242,079 | 3/1966 | McMillen | 252/39 |
| 3,342,733 | 9/1967 | Robbins | 252/49.7 |
| 3,362,970 | 1/1968 | Patton | 252/49.7 |
| 3,372,114 | 5/1968 | Rense | 252/39 |
| 3,629,109 | 12/1971 | Gergel et al. | 252/39 |
| 3,660,288 | 5/1972 | Hansen | 252/39 |
| 3,734,963 | 5/1973 | Langer et al. | 252/49.7 |
| 3,816,310 | 6/1974 | Hunt | 252/39 |
| 3,833,500 | 9/1974 | Carter | 252/39 |
| 3,868,330 | 2/1975 | Meinhardt et al. | 252/33.6 |
| 3,909,430 | 9/1975 | Hotten | 252/49.8 |
| 4,011,167 | 3/1977 | Chibnik et al. | 252/49.7 |
| 4,176,075 | 11/1979 | Alexander et al. | 252/49.7 |
| 4,192,768 | 3/1980 | Budnick | 252/396.1 |
| 4,200,544 | 4/1980 | Forsberg | 252/39 |
| 4,213,868 | 7/1980 | Bitely, Jr. et al. | 252/39 |
| 4,213,869 | 7/1980 | Kosinsky | 252/39 |
| 4,229,309 | 10/1981 | Chen et al. | 252/39 |
| 4,253,976 | 3/1981 | Forsberg | 252/39 |
| 4,409,112 | 10/1983 | Urmy, Jr. | 252/33.4 |
| 4,475,949 | 10/1984 | Ross et al. | 252/39 |
| 4,582,616 | 4/1986 | Kita | 252/39 |
| 4,627,928 | 12/1986 | Karn | 252/39 |
| 4,659,488 | 4/1987 | Vinci | 252/39 |
| 4,775,490 | 10/1988 | Nichols et al. | 252/25 |

OTHER PUBLICATIONS

WO 82/02058, "Hot Metal Forging and Stamping Lubricant Composition", Rocol Limited, Jun. 24, 1982.

*Primary Examiner*—Deborah L. Kyle
*Assistant Examiner*—Valerie Fee
*Attorney, Agent, or Firm*—Peterson, Wicks, Nemer & Kamrath

[57] ABSTRACT

Corrosion protection of battery terminals and connectors is disclosed by use of a novel corrosion protective composition comprised of a lithium grease; an alkaline alkali metal salt, such as sodium bicarbonate; and an alkaline earth metal salt, such as magnesium oxide. The composition is prepared by mixing the ingredients at a temperature below the liquification point of the lithium grease. The composition is applied to at least one of the terminals and the connector.

20 Claims, No Drawings

BATTERY TERMINAL CORROSION PROTECTION

BACKGROUND OF THE INVENTION

1. Field of the Invention

This invention relates to corrosion protection of battery terminals and connections of batteries, and in particular to a composition for preventing or stopping corrosion of the battery terminals and connectors, for batteries of the types used in vehicles, such as, cars, trucks, boats, recreational vehicles, motorcycles, mowers, snow blowers, tractors and the like.

2. Description of Related Art

In the past various attempts have been made to minimize or prevent corrosion around battery terminals. One such attempt is to coat the terminals and the adjacent connector with materials such as vaseline. While this helps to some extent, vaseline, particularly in hot weather, tends to melt or liquify and be removed from the connectors and terminals thereby decreasing any protection it might offer. Other attempts have been the use of felt pads which are placed over the terminals and contain chemicals to neutralize any corrosion which might arise. Again while somewhat effective, this has not proven entirely satisfactory, and some of the chemicals employed may be irritating to the skin and while not toxic require care in handling.

DESCRIPTION OF THE INVENTION

A composition has now been discovered which effectively stops corrosion of the battery terminals and connectors thereto. Tests indicate the coating of the battery terminals and connectors with the composition showed no signs of corrosion under all test conditions.

The composition of the present invention comprises a lithium grease, and alkali metal or alkaline earth metal salt and an alkaline earth metal oxide. More specifically, the composition comprises lithium grease, sodium bicarbonate and magnesium oxide, all of which materials are readily and commercially available. Further, all of the materials and the composition of the present invention are not irritating to the skin and not fatal if swallowed.

The composition is prepared by mixing the ingredients or components of the composition at ambient (room) temperatures. Tests have indicated that mixing of the components at elevated temperatures, i.e., above the melting or liquification point of the grease, so that the mixture is liquified, results in a lesser degree of protection against corrosion. Accordingly it is preferred that the components be mixed at the usual room temperature encountered, such as about 65° to about 95° F. or about 18° to 35° C.

In the most preferred form, the composition is formed from 32 ounces by weight of lithium grease, 16 ounces of the bicarbonate (sodium bicarbonate) and 1 ounce of the oxide (magnesium oxide). More generally, the composition by weight based on 32 ounces of lithium grease, may employ between about 10 to about 20 ounces of the sodium bicarbonate and about 0.08 to about 2 ounces of magnesium oxide. Thus, the composition will contain, based on the weight of the lithium grease employed, from about 30 to about 60% of the alkali metal bicarbonate and from about 0.25 to about 6.5% of the alkaline earth metal oxide. Based on the weight of total composition, the bicarbonate will comprise from about 20 to about 40% by weight and the oxide from about 0.2 to about 4% by weight, with the lithium grease accordingly comprising about 60 to about 80% by weight.

While not intended to be limiting, the lithium grease is formed of a very stable soap and a paraffinic oil base having little tendency to breakdown or flow and leak during service and the grease has a high resistance to water wash and high temperatures. Thus the grease will not tend to liquify at the temperatures encountered in service such as under the hood of an automobile near the engine or heat from sunlight shining on the hood of the vehicle and will not be washed or rinsed away from the terminals or connectors when exposed to water either during operation of the vehicle or during washing of the vehicle. The lithium grease accordingly holds the alkali metal bicarbonate and the alkaline earth metal oxide in place in contact with the terminals and the connectors, thereby enclosing or encapsulating the terminals and the connections to prevent the escape of gases and/or prevent oxygen from the atmosphere from contacting the terminals or the connectors. Because of the stability of the lithium grease against heat, the bicarbonate and the oxide are retained in contact with the terminals and connectors and will not fall away therefrom and permit passage of gases to and from the terminals and the connectors. Lithium grease also conducts electricity, with lithium having conductivity similar to that of aluminium.

As indicated, sodium bicarbonate is the preferred material. Sodium bicarbonate, a salt of a strong base and a weak acid, is alkaline salt which also conducts electricity. Because of its weak alkalinity, it will neutralize acids which may be present or occur around terminals and connectors which may cause corrosion. Similarly, the magnesium oxide will react with any acid present.

While sodium bicarbonate is the preferred material which is readily available, any alkali metal salt having alkaline or basic properties or characteristics on the order of sodium bicarbonate may be employed. Included are the other alkali metal bicarbonates such as lithium or potassium bicarbonate. Other materials which may be used are the carbonates, such as the alkali metal carbonates, sodium and potassium, and the alkaline earth metal carbonates such as calcium carbonate. Similarly other oxides having characteristics of properties similar to magnesium oxide may be employed, such as, calcium oxide.

A variety of lithium greases are available commercially. Among these are "Unocal Unoba EP," which is described by the supplier UNOCAL as a smooth, buttery, multi-purpose grease made from lithium soap (lithium 12-hydroxystearate soap) and a paraffinic base oil. The product is available in various grades containing from about 3 to about 7% by weight of the lithium soap. The preferred product from UNOCAL is product code 5455, grade 2, containing 6.8% lithium soap and having a Dropping Point ASTM °C. (°F.) of 190° (374°), a Viscosity Index of 92, and a base oil viscosity SUS @ 100° F. of 723. The other grades of greases have the same properties but have a lithium soap content of 3.4% and 5.6%. Another commercially available lithium grease product is "MOBILITH," available from Mobil, and described by the supplier as a stable soap base (lithium hydroxystearate) and a high quality mineral oil. "MOBILITH" 21 and 22 are two grades having a minimum Dropping Point of 260° C. (500° F.) and an operational range of from −30° F. to 350° F. The mineral oil base, which is present in an amount by weight of 88 or 89%, has a viscosity at 210° F. of 70 SUS.

Sodium bicarbonate, also designated as sodium hydrogen carbonate, sodium acid carbonate or baking soda, is available commercially from Allied Chemical, C.A.S. No. 144-55-8, as "BETTER BLEND SODA" a free flowing food grade product. The magnesium oxide (MgO), C.A.S. No. 1309-48-4, is available from Martin Marietta Magnesia Specialties in the form of a finely divided white powder.

The invention can be further illustrated by means of the following example in which all parts or percentages are by weight unless otherwise specified.

EXAMPLE I

The following ingredients were thoroughly mixed cold and dry at room temperature in the amounts indicated:

| | |
|---|---|
| Lithium grease (Unocal UNOBA - Grade 2) | 32 ounces |
| Sodium bicarbonate (Allied Chemical) | 16 ounces |
| Magnesium oxide (Martin Marietta) | 1 ounce |

In testing the corrosion protecting properties, the composition was applied to the terminals and the connecting cables of a battery in a vehicle which also had additional hookup for operation of a winch. Prior to application of the composition to the terminals and connecting cables, the battery required monthly maintenance during the winter months to keep the battery terminals and connections free from corrosion. After application of the composition, neither battery post showed any sign of corrosion after operation under conditions in which corrosion had earlier caused difficulty.

What is claimed is:

1. A corrosion protective composition formulated for protection of battery terminals and connectors thereto consisting essentially of a mixture of (a) a lithium grease comprised of a lithium soap and a paraffinic oil, (b) an alkali metal or alkaline earth metal salt and (c) an alkaline earth metal oxide.

2. A composition as defined in claim 1 wherein said alkali metal salt is sodium bicarbonate.

3. A composition as defined in claim 1 wherein said alkaline earth metal oxide is magnesium oxide.

4. A composition as defined in claim 1 wherein said lithium grease comprises a mixture of a lithium hydroxystearate soap and a paraffinic oil.

5. A composition as defined in claim 4 wherein said lithium grease contains from about 3 to about 7% by weight of said lithium soap.

6. A composition as defined in claim 1 in which said lithium grease comprises about 60 to about 80% by weight of said composition, said alkali metal salt is sodium bicarbonate present in an amount of about 20 to about 40% by weight and said alkaline earth metal oxide is magnesium oxide present in, an amount by weight of about 0.2 to about 4%.

7. A composition as defined in claim 6 which contains about 32 parts by weight of said lithium grease, about 16 parts by weight of said sodium bicarbonate and about 1 part by weight of said magnesium oxide.

8. A process of protecting battery terminals and associated connectors from corrosion comprising applying to at least one of said terminals and connector the composition consisting essentially of a lithium grease, an alkali metal or alkaline earth metal salt and an alkaline earth metal oxide.

9. A process of preparing a corrosion protective composition consisting essentially of mixing at a temperature below the liquification temperature thereof a lithium grease, an alkaline metal or alkaline earth metal salt and an alkaline earth metal oxide.

10. A process as defined in claim 9 wherein said mixing is conducted at a temperature in the range of about 65° to about 95° F.

11. A process as defined in claim 10 wherein said alkali metal salt is sodium bicarbonate and said metal oxide is magnesium oxide.

12. A process as defined in claim 8 wherein said alkali metal salt is sodium bicarbonate.

13. A process as defined in claim 8 wherein said alkaline earth metal oxide is magnesium oxide.

14. A process as defined in claim 8 wherein said lithium grease comprises a mixture of a lithium hydroxystearate soap and a paraffinic oil.

15. A process as defined in claim 14 wherein said lithium grease contains from about 3 to about 7% by weight of said lithium soap.

16. A process as defined in claim 8 in which said lithium grease comprises about 60 to about 80% by weight of said composition, said alkali metal salt is sodium bicarbonate present in an amount of about 20 to about 40% by weight and said alkaline earth metal oxide is magnesium oxide present in an amount by weight of about 0.2 to about 4%.

17. A process as defined in claim 16 which contains about 32 parts by weight of said lithium grease, about 16 parts by weight of said sodium bicarbonate and about 1 part by weight of said magnesium oxide.

18. A process as defined in claim 17 wherein said lithium grease is a mixture of a lithium soap and a paraffinic oil.

19. A process as defined in claim 18 wherein said lithium soap is lithium hydroxystearate.

20. A process as defined in claim 19 wherein said lithium soap in said lithium grease is present in an amount of about 3 to about 7% by weight of said grease.

* * * * *

UNITED STATES PATENT AND TRADEMARK OFFICE
CERTIFICATE OF CORRECTION

PATENT NO. : 5,116,538
DATED : May 26, 1992
INVENTOR(S) : Jerome Johnson

It is certified that error appears in the above-identified patent and that said Letters Patent is hereby corrected as shown below:

Line 5 of the ABSTRACT, cancel "salt" and substitute therefor --oxide--.

Column 4, line 1, cancel ",".

Signed and Sealed this

Eighteenth Day of January, 1994

Attest:

BRUCE LEHMAN

Attesting Officer     Commissioner of Patents and Trademarks